(12) United States Patent
Brown et al.

(10) Patent No.: US 6,240,665 B1
(45) Date of Patent: Jun. 5, 2001

(54) ILLUMINATED SIGN (75) Inventors: Tobias A. Brown, New Paltz, NY (US); Heinz K. Filzer, Brookfield, CT (US)

(73) Assignee: JJI Lighting Group, Inc., Greenwich, CT (US)

( * ) Notice: Subject to any disclaimer, the term of this patent is extended or adjusted under 35 U.S.C. 154(b) by 0 days.

(21) Appl. No.: 09/225,783

(22) Filed: Jan. 5, 1999

(51) Int. Cl.⁷ .................................................. G09F 21/04
(52) U.S. Cl. ................................................ 40/570; 40/572
(58) Field of Search ....................... 40/570, 572; 362/31; 411/400

(56) References Cited

U.S. PATENT DOCUMENTS

| | | | |
|---|---|---|---|
| 1,724,243 | * | 8/1929 | Willey ................................. 40/572 X |
| 1,765,614 | * | 6/1930 | Roberts et al. .................. 411/400 X |
| 3,402,494 | * | 9/1968 | Gray ....................................... 40/570 |
| 3,931,689 | * | 1/1976 | Shine ..................................... 40/570 |
| 5,676,444 | * | 10/1997 | Liao ................................... 40/546 X |
| 5,729,924 | * | 3/1998 | Reading ............................. 40/572 X |
| 5,796,331 | * | 8/1998 | Lamparter .......................... 40/572 X |
| 5,915,855 | * | 6/1999 | Murase ................................. 40/546 |
| 5,954,423 | * | 9/1999 | Logan et al. ...................... 40/570 X |

\* cited by examiner

*Primary Examiner*—Joanne Silbermann
(74) *Attorney, Agent, or Firm*—Fitzpatrick, Cella, Harper & Scinto

(57) ABSTRACT

A thin illuminated sign is described which is formed of two essentially mirror image frame members at least one of which has a central opening therethrough to expose a translucent sign element including signage indicia associated therewith. The frame elements contain mirror image mounting members adapted to support therein a mounting channel for a cold cathode florescent tube along at least one of the edges of the translucent member for projecting light therein.

23 Claims, 14 Drawing Sheets

ILLUMINATED SIGN

BACKGROUND OF THE INVENTION

Field of the Invention

The present invention relates to illuminated signs, and more in particular to thin emergency and exits signs illuminated using cold cathode florescent lamps and/or LED light panels.

Previously proposed signage, particularly for emergency and exit signs have typically been manufactured for use with incandescent or regular florescent bulbs. As a result the signs are relatively bulky and not aesthetically pleasing. This is particularly true with regard to those fixtures that are in intended to operate as combination AC/DC fixtures which have battery backups and require large battery modules.

In recent years some attempts have been made to manufacture emergency and exit signs using LED lamps because of their reduced size. Such lamps are typically mounted in an elongated strip within the fixture. While these lamps permit a smaller frame to be used for the fixture, they suffer from the limitation that LED's, to date, are available only in limited in colors, namely red, green and amber. They are not yet available to produce white light. As a result, the contrast in the sign message and the background produced with such lamps is not entirely satisfactory.

Recently a new form of lamp has been developed called a cold cathode florescent lamp. This lamp is of known construction and is very thin relative to its length, typically being about ⅜ to ¼ of an inch in diameter. These lamps produce white light and therefore have great flexibility in signage applications. They also have the advantage that they require relatively low power to operate.

In accordance with the present invention, an illuminated sign fixture is disclosed which is designed to use a cold cathode fluorescent lamp (CCFL) or, alternatively, an LED lamp depending upon the requirements of the user. The fixture is formed of two frame elements, at least one of which has a central opening for exposing a sign panel. The other of the frame elements can take one of several forms, depending upon the particular mounting application desired. In each case, however, the second frame element has a peripheral portion which is complementary to the peripheral portion of the first frame element surrounding the opening, with both of those peripheral portions being mirror images of each other. The inner faces of these peripheral portions of the two frame elements contain mirror image mounting means for mounting either a CCFL or LED strip between the frame elements. They also include a mounting arrangement for supporting between the frames the small electrical circuit boards used to control current flow to the lamps.

In one embodiment a mounting canopy is provided for securing the frame to a ceiling or vertical wall. The canopy may contain electrical control elements and/or battery backup for the CCFL or LED lamp system used in the frame.

In accordance with another aspect of the invention, a mounting channel arrangement is provided for supporting either the CCFL or the LED strip within the frame. The mounting channel is generally U-shaped and has a pair of spaced legs which define an opening therebetween. The channel is mounted between the frames by a frictional engagement of interrupted ribs on the frames and complementary grooves in the legs of the channel. The grooves receive the interrupted ribs and hold the channel frictionally within the frame, with the channel opening facing toward an edge of the sign within the frame. A CCFL is supported within the channel with a pair of spring clips. Alternatively, if an LED strip is used, the circuit board on which the strip is mounted is received in a pair of opposed internal grooves formed in the legs of the channel. The grooves and circuit board are dimensioned so that the board is held in place with a friction fit.

In another embodiment of the invention one of the frame members includes an integral canopy for supporting electrical controls and batteries if desired. The canopy is closed with a cover containing a Molex connector and is adapted to be mounted on an electric junction box cover by a keyhole and pin arrangement so that the Molex connection makes an automatic connection when the fixture is mounted.

It is therefore an object of the present invention to provide an illuminated sign which is a relatively thin structure that can contain the electrical controls and batteries for the sign.

Another object of the present invention is to provide an illuminated sign arrangement which can utilize either a CCFL or an LED strip as the source of light.

A still further object of the present invention is to provide a flexible lighting system suitable for use with two different light sources which is relatively simple to manufacture and assemble.

The above, and other objects, features and advantages of the present invention to be apparent from the following detailed description of illustrative embodiments thereof, which used to read in connection with the accompanying drawings wherein:

Figures 1, 2:
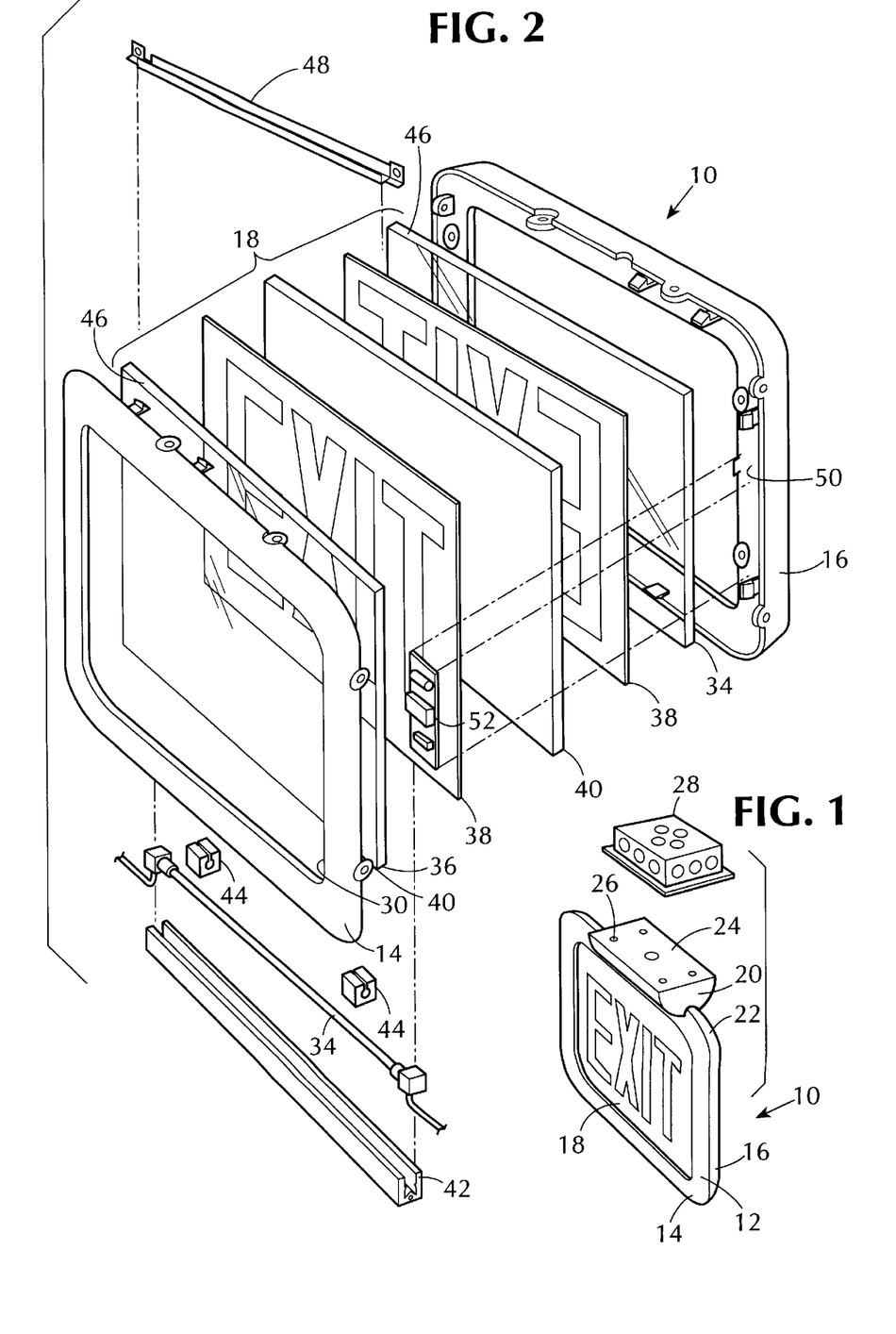
FIG. 1 is a perspective view of an illuminated sign constructed in accordance with the present invention.
FIG. 2 is an enlarged exploded perspective view of the sign of FIG. 1.

Referring now to the drawings in detail and initially to FIG. 1, an illuminated sign 10, constructed in accordance with the present invention, is illustrated. The sign includes a frame 12 including first and second frame elements 14, 16, and a central sign panel assembly 18 mounted between the frame members 14, 16. Illuminated sign 10 is adapted to contain either a CCFL or an LED light strip to illuminate the panel assembly 18 as described hereinafter.

A canopy 20 for sign 10 is provided which is adapted to be secured to the peripheral edge 22 of frame 12. Canopy 10 can contain electrical controls for the sign and is adapted to have a closure plate 24 secured thereto by screws 26 or the like. The closure plate is adapted to be mounted on a conventional junction box 28 as described hereinafter.

As illustrated in FIG. 2, illuminated sign 10 includes two mirror image frame members 14, 16. In this embodiment of the invention each of the frame members is a mirror image of the other and contains a central opening 30 through which the sign's panel assembly 18 is exposed to view. In this particular embodiment, the sign is illustrated as containing and supporting a CCFL 34. Lamp 34 is positioned within frame elements 14, 16 along one edge of the sign panel assembly 18 to project light into that assembly. With a white CCFL and a two sided open frame, as illustrated in this embodiment, the sign assembly 18 includes two transparent or translucent plates 34, 36 and a pair of mylar films 38 which preferably have a white background and colored indicia painted thereon (for example a red word "exit"). Mylar films 38 are separated by a white panel 40 so that the indicia do not interfere with each other and only one film is seen from a particular side. The white light from CCFL 34 is projected into the lower edges 40 of plates 34, 36 and is reflected off the mylar film illuminating the same.

CCFL 34, as described hereinafter, is held in an upwardly open channel member 42 by a pair of rubber boats 44. The channel is mounted along one edge to opening 30, to reflect light from CCFL 34 back into the panels. Along the upper and edges 46, a reflector strip 48 is mounted on one of the frame members.

The inner faces 50 of each of frame members 14, 16 have a peripheral portion surrounding the respective opening 30 therein. These peripheral frame portions 50 have mounting means for connecting the two frame members together and for mounting electrical controls and the like for lamp 34. These mounting means on each frame are a mirror image of each other.

Figure 3:
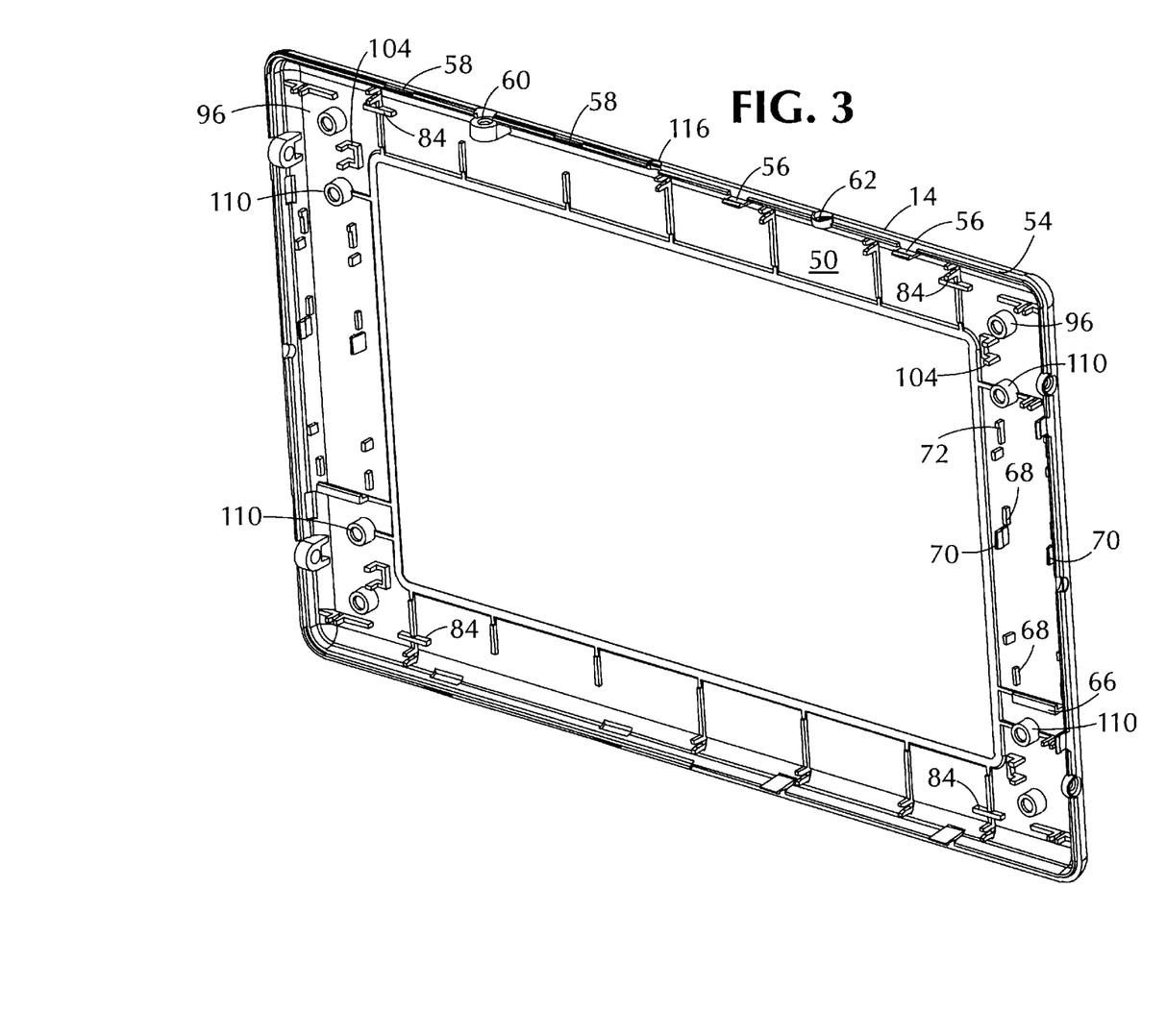
FIG. 3 is a perspective view of the inner face of one of the frame elements shown in FIG. 2.
Figure 4:
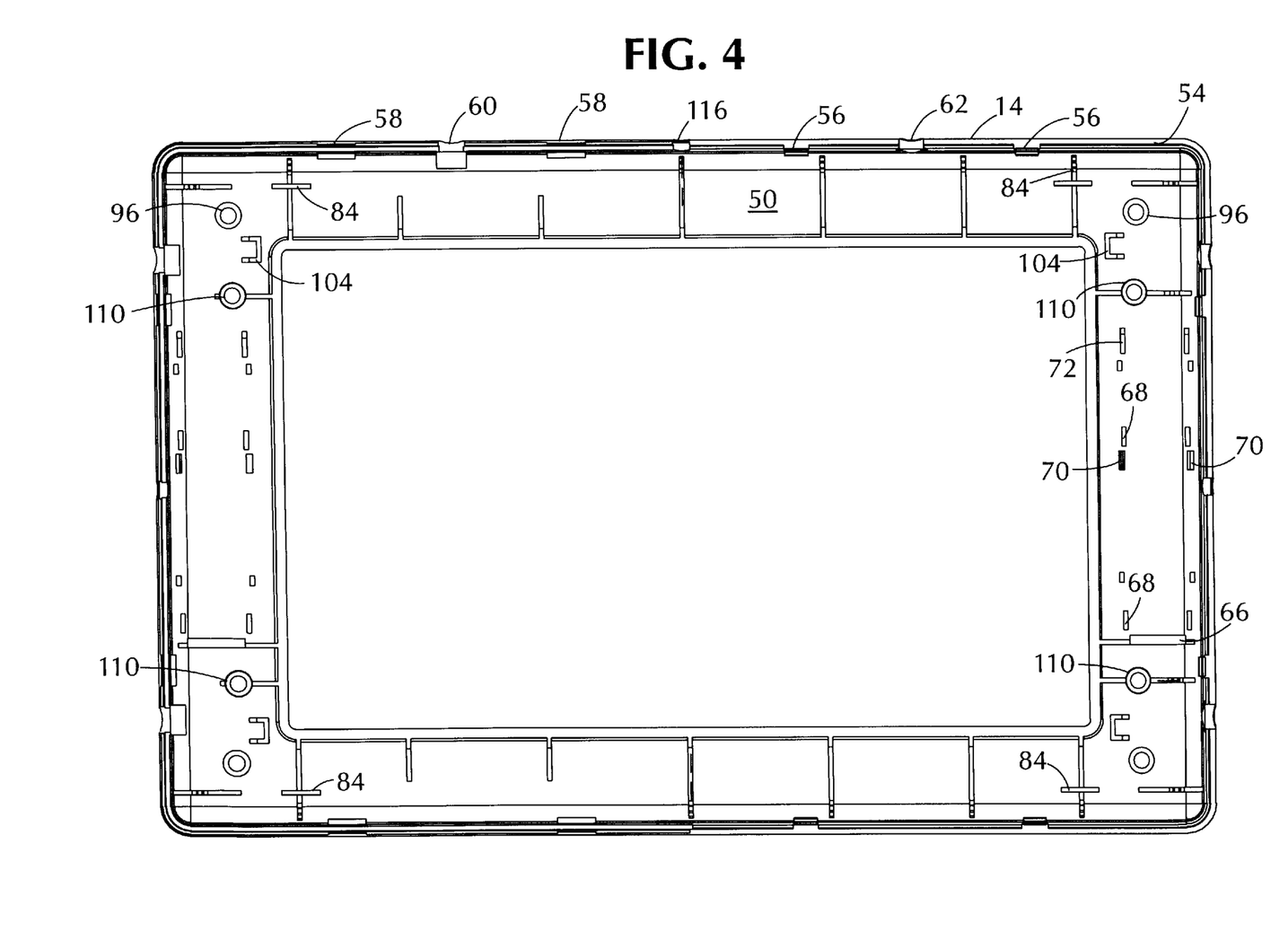
FIG. 4 is a plan view of the frame element shown in FIG. 3.
Figure 5:
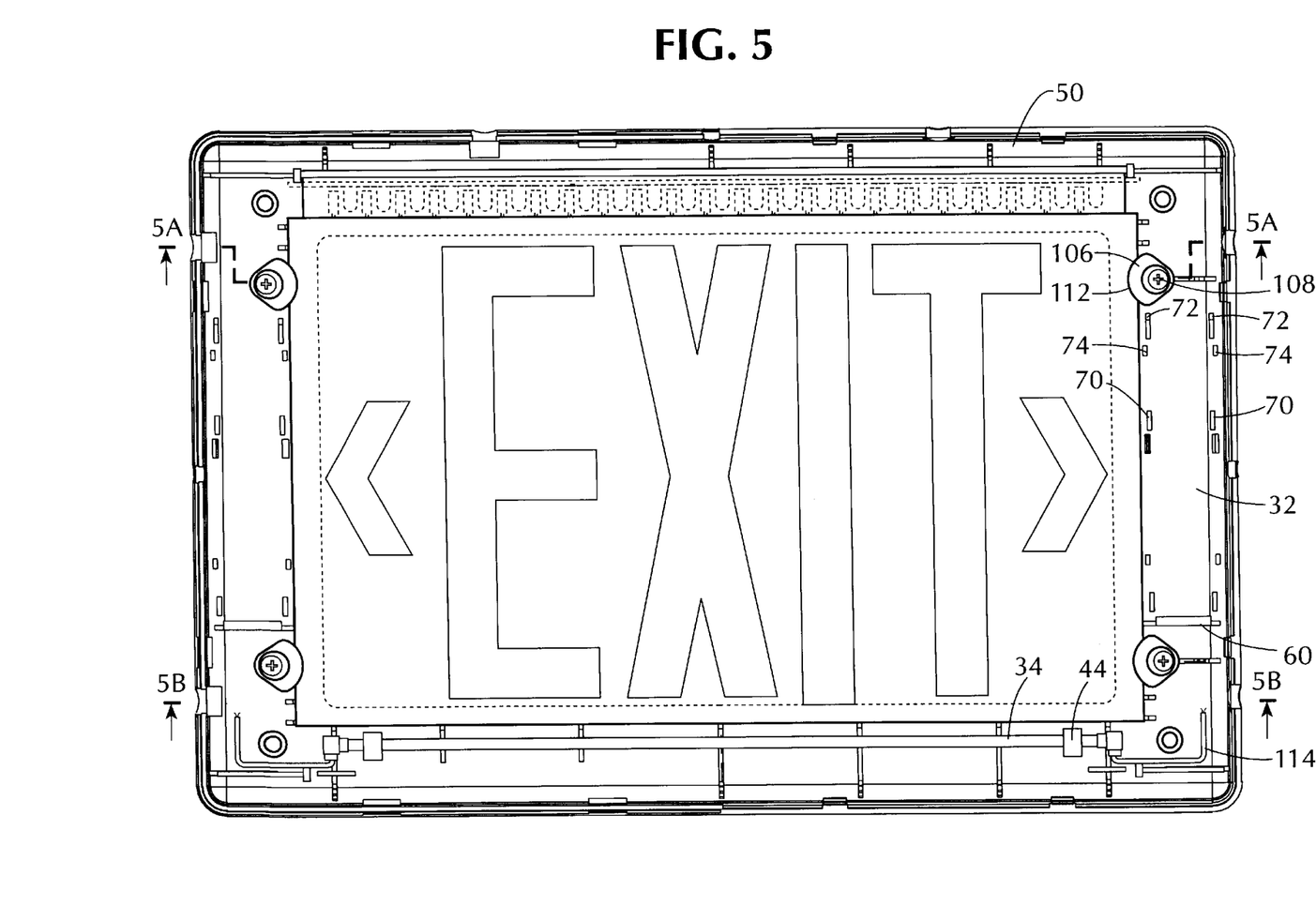
FIG. 5 is a plan view similar to FIG. 4 showing the sign panel in place and a CCFL mounted at the bottom of the sign.
Figure 5A:
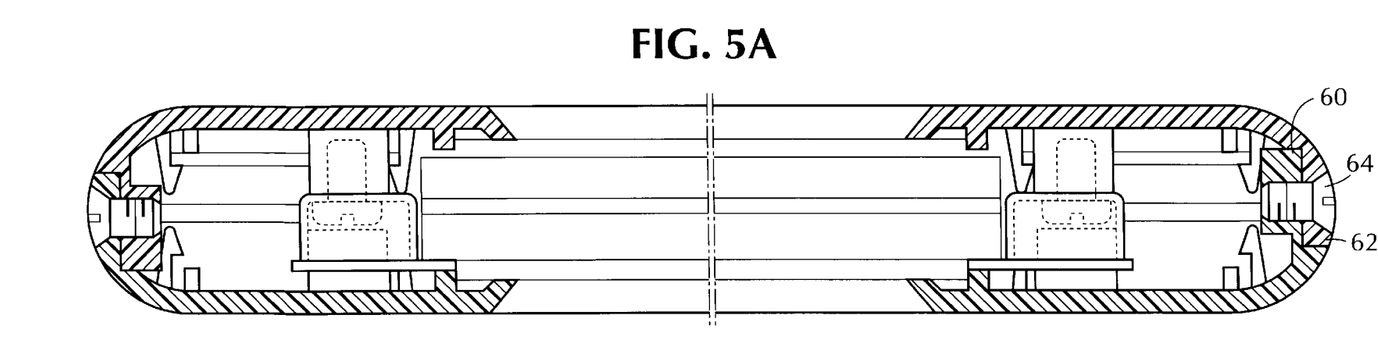
FIG. 5A is a sectional view taken along line 5A—5A of FIG. 5.
Figure 5B:
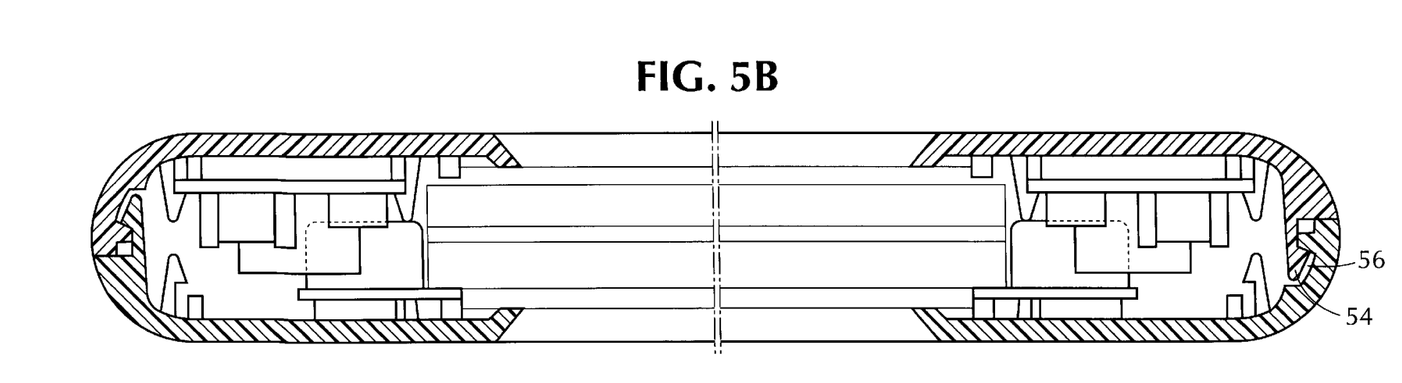
FIG. 5B is a sectional view taken along line 5B—5B of FIG. 5.

As seen in FIG. 3, the inner face 50 of panel 14 is illustrated in detail. The inner face of the other panel 16 is the mirror image of what is illustrated in FIG. 3. Each panel has a peripheral edge 54 which includes a plurality of cooperating resilient snap fingers 56 and snap recesses 58. These recesses and snaps mate with each other when the two mirror image frame members are engaged to hold the frame together, as illustrated in FIG. 5B. In addition, the frame has pairs of complementary bosses 60, 62 which override each other when the frame is assembled, so that a permanent connection between the two frame elements can be made by screws 64, as illustrated in FIG. 5A.

The inner faces 50 of frame elements 14, 16 also include a mounting arrangement for the electrical components 52, which generally take the form of an electrical circuit board. As seen in FIG. 3 each panel (on two opposed sides) has a mounting flange 66 which extends inwardly from inner face 50 in a generally L-shape. Support spacer bars 68 are molding in the inner face to support the circuit board in 52 spaced relationship from the surface of face 50. In addition, resilient tabs 70 are provided to snap fit over the edges of the circuit board 52 and hold it in place. This arrangement is illustrated in plan view in FIG. 5. As seen both in FIG. 3 and FIG. 5, additional stop members 72 are provided to support the upper end of a larger circuit board if a particular application requires a larger circuit board. In addition, side supports 74 are provided to resist lateral shifting of the circuit board.

Figures 5C, 5D, 5E:
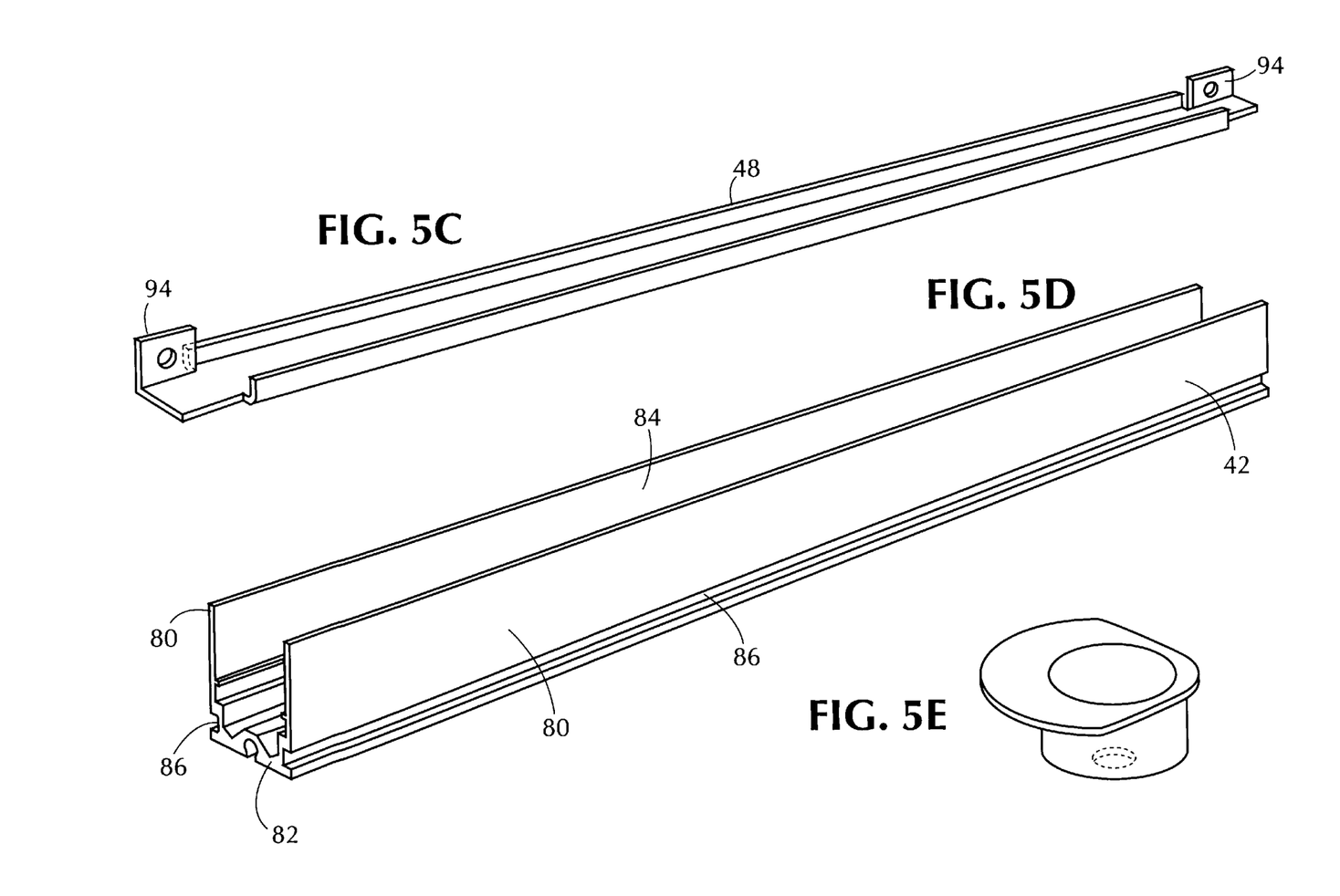
FIG. 5C is a perspective view of a light reflector bar suitable for use in the present invention.
FIG. 5D is a perspective view of the bulb mounting channel used in accordance with the invention.
FIG. 5E is a perspective view of an asymmetric clamp element.

Referring now to FIG. 5D support channel 42 for CCFL 34 is illustrated. This channel is generally U-shaped and has a pair of spaced legs 80 and a bight portion 82. The spaced legs define an open edge 84. The outer surfaces of the legs have exterior longitudinal channels 86 formed therein. Each channel is adapted to receive an interrupted rib 84 formed on the inner surface 50 of the frame members. Interrupted ribs 84 are provided at opposite sides of the frame members so that a channel 42 may be mounted at the top edge or bottom edge of the sign, or both. The segments of interrupted rib 84 fit in slot 86 with a friction fit to hold the channel in place in the frame. The ribs elements on each of the frame members enter each of the grooves on opposite sides of the channel to hold it firmly in place when the frame members 14 and 16 are secured together.

Figure 5F:
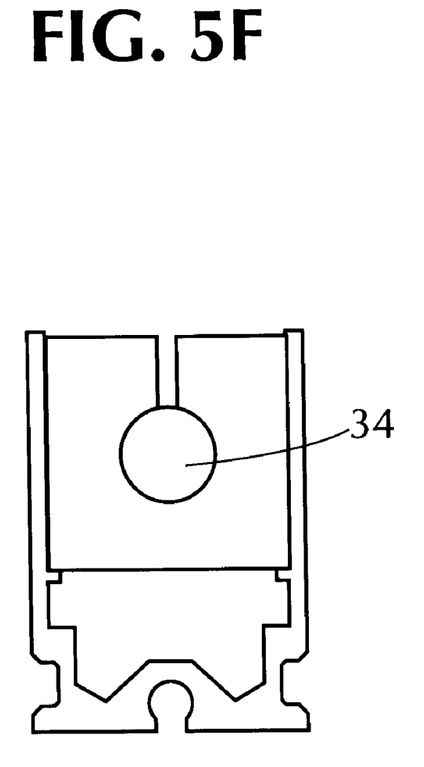
FIGS. 5F is a cross sectional end view of the channel shown in FIG. 5E with the CCFL mounted therein.
Figure 5G:
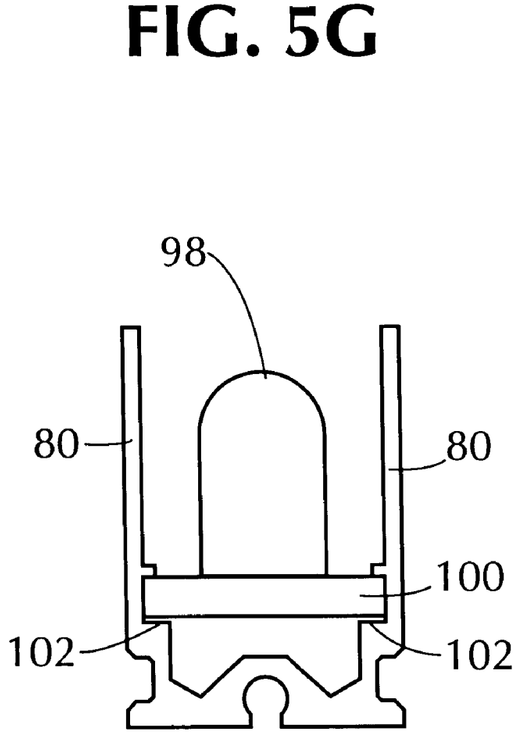
FIG. 5G is an end view similar to FIG. 5F but showing an LED board mounted in the channel.

FIGS. 5F and 5G are end views of channel 42 and illustrate in detail the rubber boat 44 which holds CCFL 34 in place. One boat is provided at each end of channel 42. Each boat 44 is a generally square block of rubber shaped to fit within channel 42. The boat has a central slot and circular recess 88 formed in it to receive and retain an end of the CCFL. The boat is inserted through the open top 84 of channel 42 until the bottom 90 of the boat engages ribs 92 on the inner faces of the legs 80 of the channel. By this arrangement CCFL 34 is firmly yet resiliently held in place in the channel. The inner surfaces of channel 42 serve to reflect light from CCFL 34 and direct it upwardly into the edge of the sign panel assembly 18.

As illustrated in FIG. 2, when a single CCFL 34 is used, an upper reflector bar 48 is used as well. This reflector bar is shown in more detail FIG. 5C. Preferably reflector bar 50 has a shiny or reflective surface facing the edge of assembly 18. This reflector bar 48 is secured in place by screws (not shown) using tabs 94 at the ends of the bar and the screw bosses in the frame.

In an alternative embodiment, an array of LEDs 98 can be used in lieu of the CCFL. As is known in the art, LEDs are mounted on an electrical circuit board-like panel 100. As seen in FIG. 5G, the legs 80 of the channel 42 have internal channels 102 formed therein which slidably receive the edges of panel 100. The panel is held in place by a friction fit.

Referring again to FIG. 5 the replacement of channel 42 with a series of LEDs is illustrated at the top of the sign in dotted lines, for illustrative purposed.

The sign assembly 18 is held in frame 12 by a series of abutments 104 which prevent the elements of the assembly from shifting (See FIG. 3). The sign elements are clamped in place by the asymmetric clamp members 106 which are pivotally mounted on screws 108 threaded in the bosses 110 formed in the inner faces of the panels. The asymmetrical clamps have semicircular flanges 112 formed thereon which are rotated into position over the assembled plates to hold the plates of assembly 18 in place when screws 108 are tightened down.

The electrical wires 114 from lamp 34 and the wires from the circuit board 32 are guided out of the frame arrangement through a small aperture 116 formed in the upper edge of the frame as shown in FIG. 3.

Figure 6:
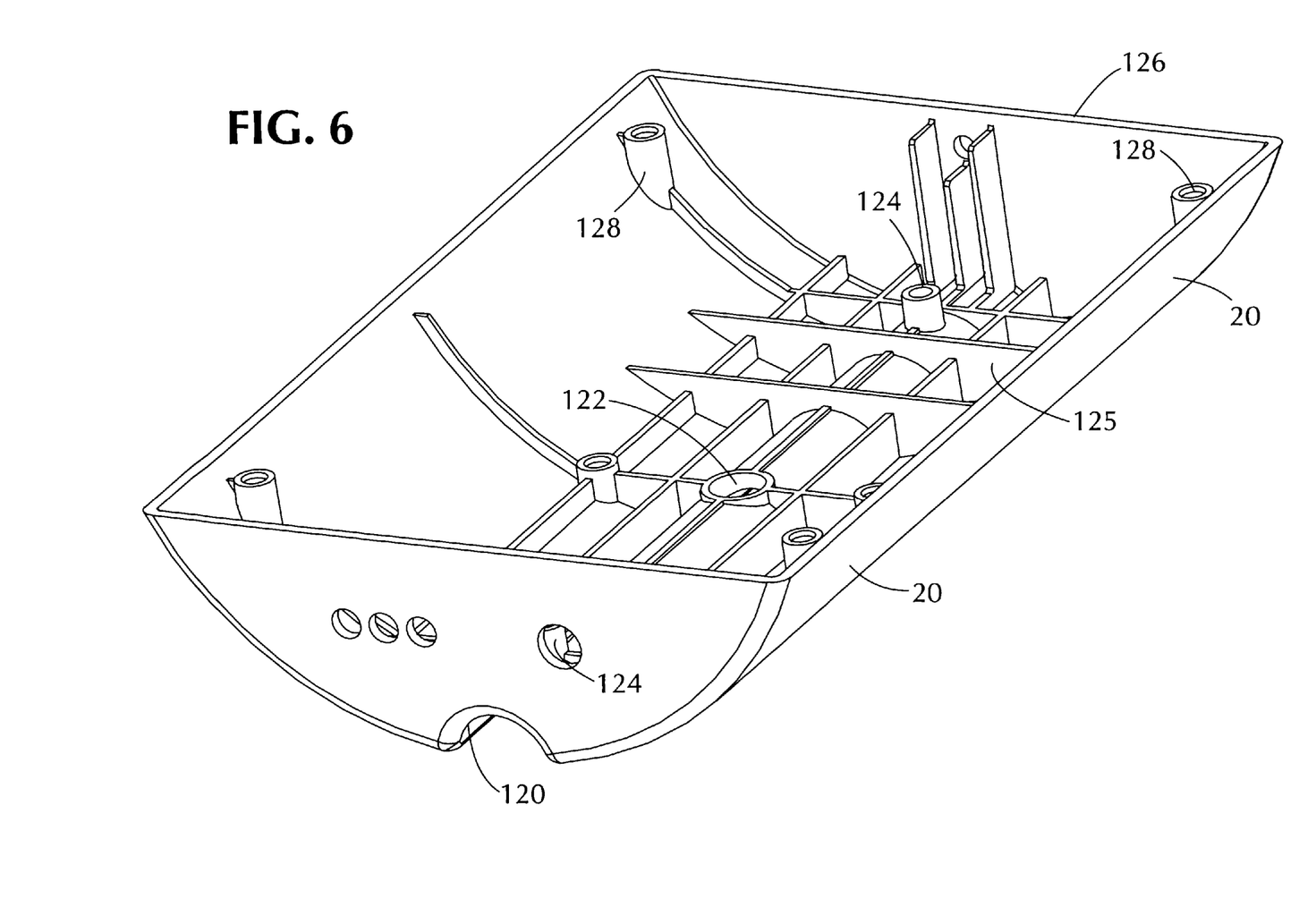
FIG. 6 is a perspective view of a canopy mounting arrangement for the embodiment of FIG. 1.

The embodiment of FIGS. 1 and FIG. 6 may use the canopy 20 to mount the frame on a ceiling or wall is illustrated. As shown in FIG. 1 canopy 20 is secured to the upper edge of the sign for mounting it to a ceiling. For wall mounting, the canopy would be secured to a side edge of the frame in the same way.

In the illustrated embodiment of the invention canopy is generally semi-cylindrical in shape and has a semi-cylindrical groove 120 formed longitudinally therein. This groove is shaped to be generally complementary to the peripheral shape of the frame of the fixture. The electrical wires from port 116 enter the canopy through an opening 122 formed therein and the canopy is secured to the frame by screws (not shown) which pass through screw bosses 124 into the screw bosses 60, 62 at the top edge of the frame, as shown in FIG. 3. The canopy provides a space for additional electrical controls, including backup batteries and switching circuits if the system is to be used alternately as an AC system with a DC backup. Molded compartments 125, as seen in FIG. 6, can be formed therein to accept modular electronic components and batteries.

The top edge 126 of canopy 20 is closed by a metal canopy plate 24 (FIG. 2) which also serves as the cover for an electrical junction box. The canopy is secured to the plate and the junction box by screws 26 which pass through the screw bosses 128 at intervals into corresponding holes in the plates and thence into conventionally provided screw threaded bosses in junction box 28.

Figure 7:
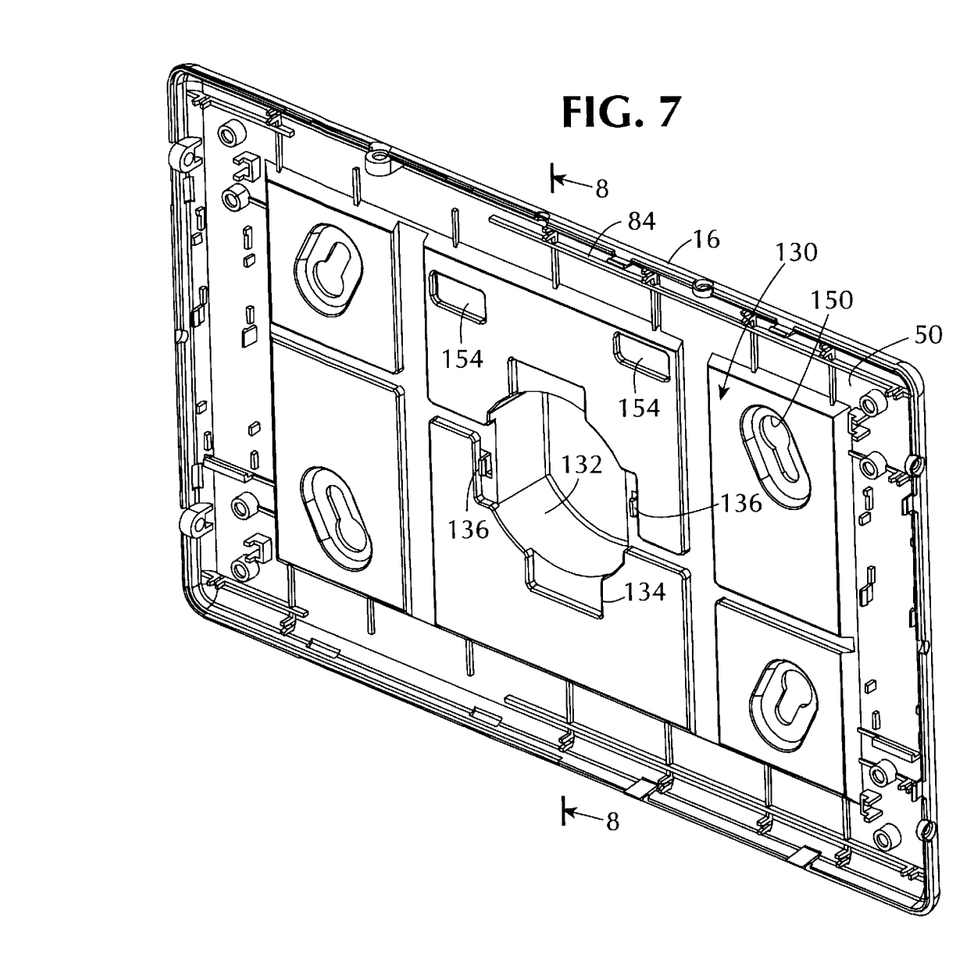
FIG. 7 is a perspective view of the rear panel of another embodiment of the present invention.

Another embodiment of the invention is illustrated in FIG. 7. Like parts illustrated in that figure are numbered with corresponding numerals to those used in the prior embodiment. In this case frame 16 does not have an opening in it and the sign is a single sided sign. It mates with and is secured to the plate frame 14 previously described.

The central portion 130 of the frame 16 of the embodiment of FIG. 7 is integrally molded in the frame and raised to provide support for the sign assembly 18. In this instance, where a CCFL is used, assembly 18 consists of a single translucent plate and mylar strip to form the signage. In this case, the central portion of frame 16 includes an integral junction box like form 132 which projects rearwardly from the frame.

As seen in FIG. 7 central portion 130 has a generally rectangular recess 134 overlying the form 132 into which a circuit board or the like can be snapped fit using tabs 136 and friction fit. Extension form 132 provides room for wiring and possible backup batteries; it is designed to fit within a conventional junction box.

Frame 16 in this embodiment includes a peripheral portion 50 as previously described for the other embodiments which is essential identical thereto and has all of the corresponding elements for mounting of the illuminating means including channel 42 and the various circuit boards previously described. In this particular illustration, interrupted rib 84 is illustrated as being somewhat longer than that of the embodiment of FIG. 3. Again however the peripheral portion of frame 16 is a essentially a mirror image of the corresponding frame element 14 which has the aperture in it.

Figure 8:
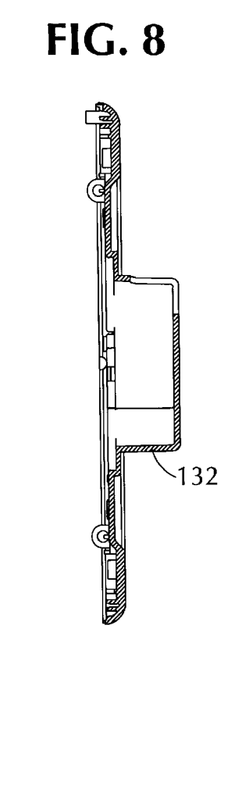
FIG. 8 is a sectional view taken along line 8—8 of FIG. 7.

In order to mount a fixture using the back plate of FIG. 7 and 8, a junction box mounting plate 140 is provided. This junction box plate has a central aperture 142 formed therein through which projection 132 will extend. Plate 140 is secured to a conventional conjunction box by screws in a conventional manner using the adjusting apertures 144 formed in the plate.

Figure 9A:
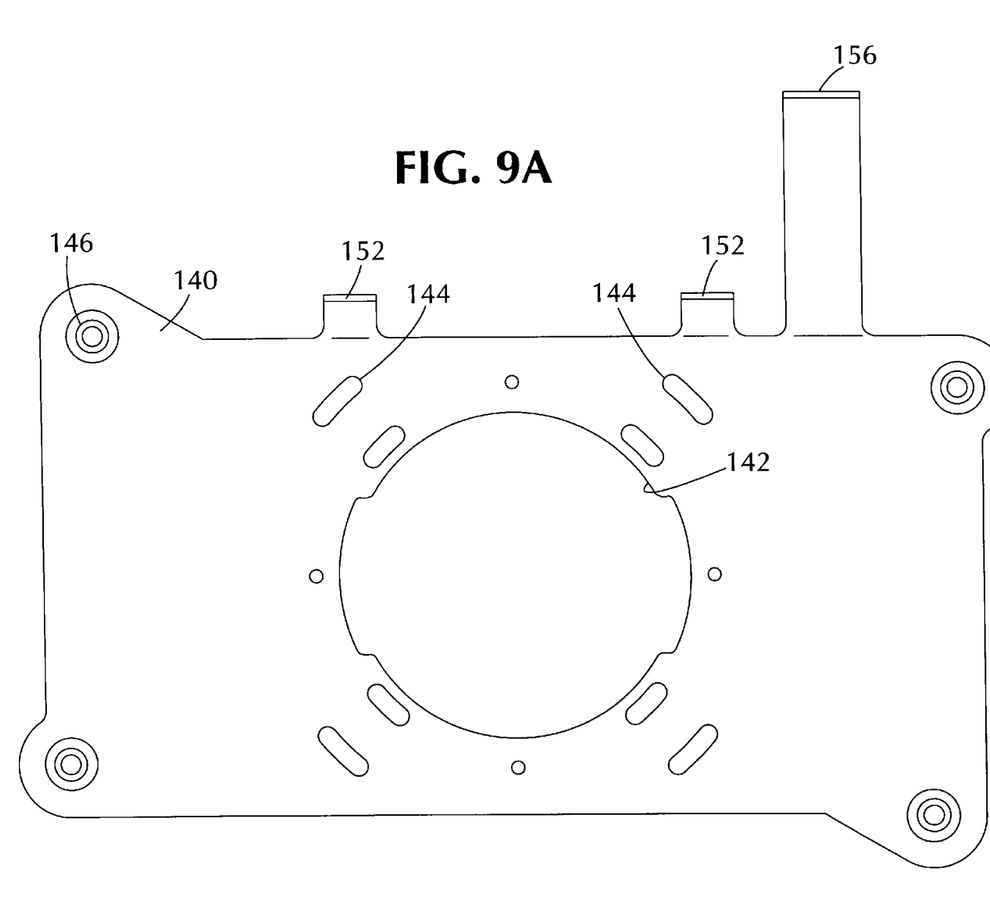
FIG. 9A is a plan view of a junction box cover plate for use with the back panel of the frame shown in FIG. 7.
Figure 9B:
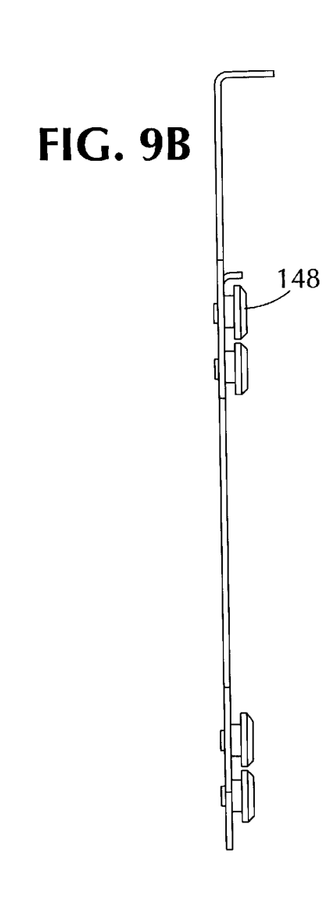
FIG. 9B is an end view of the plate of FIG. 9A.

Plate 140 also includes projecting pins 146 having heads 148 (FIG. 9B). These pins are adapted to be received in the keyhole slots 150 in frame 16. In addition, plate 140 has L-shaped tabs 152 which are adapted to be received in apertures 154 formed in frame member 16 to help stabilize the fixture when it is mounted on the junction box. An additional elongated tab 156 can be provided to engage the top edge of the frame to provide additional stability. This arrangement makes for a convenient mounting of the device on the junction box.

Figure 10:
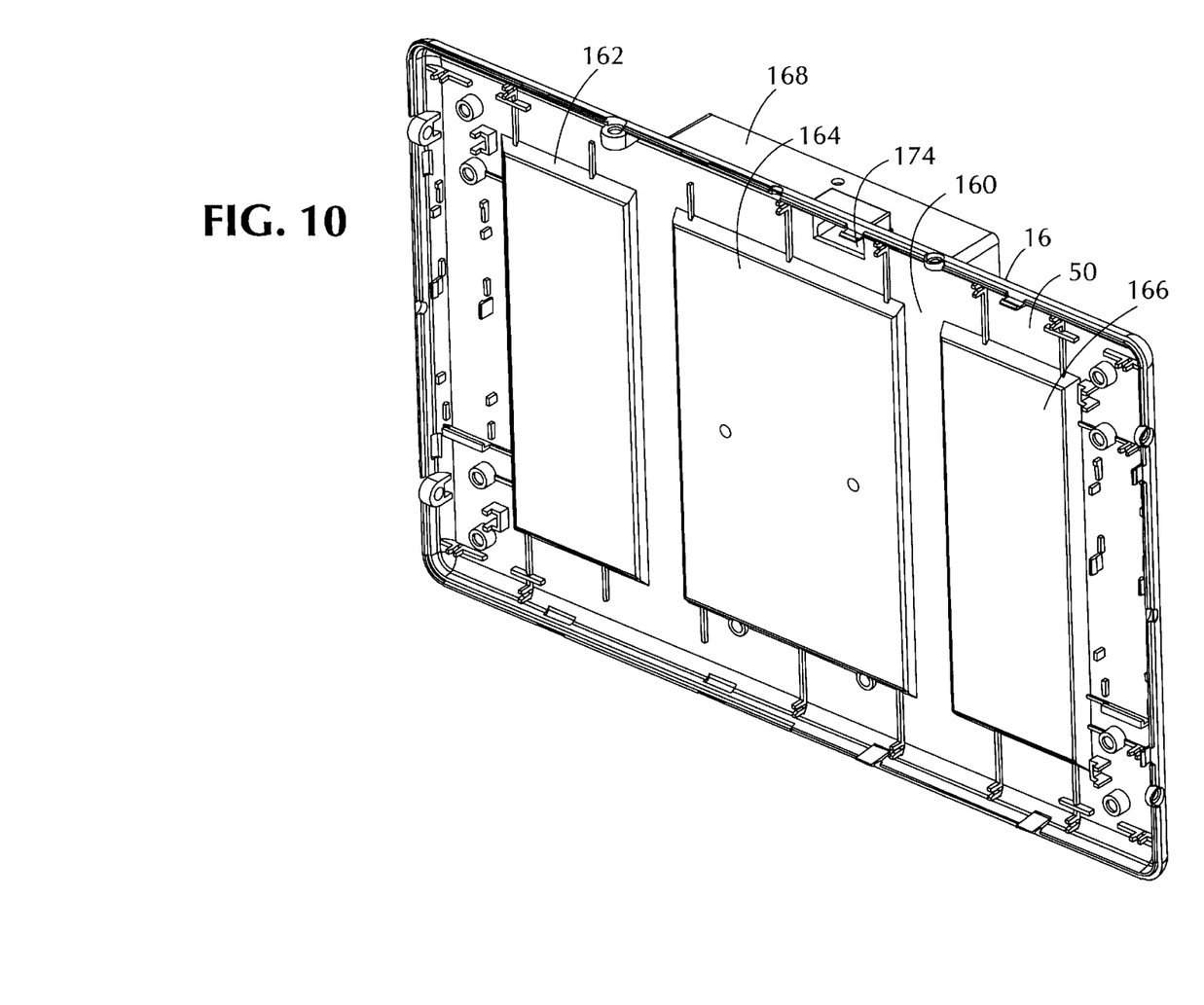
FIG. 10 is a perspective view of another rear panel for another embodiment of the present invention.

A further embodiment of the invention is illustrated in FIGS. 10–13. In this embodiment rear frame 16 is again provided with a peripheral portion 50 that is the mirror image of the peripheral portion of frame element 14. However a closed central portion 160 of frame 16 again is formed within its peripheral portion. As seen in FIG. 10 central portion 160 of this embodiment has three raised portions 162, 64 and 166 which serve to support the panel assembly 18 within the frame.

Figure 10A:
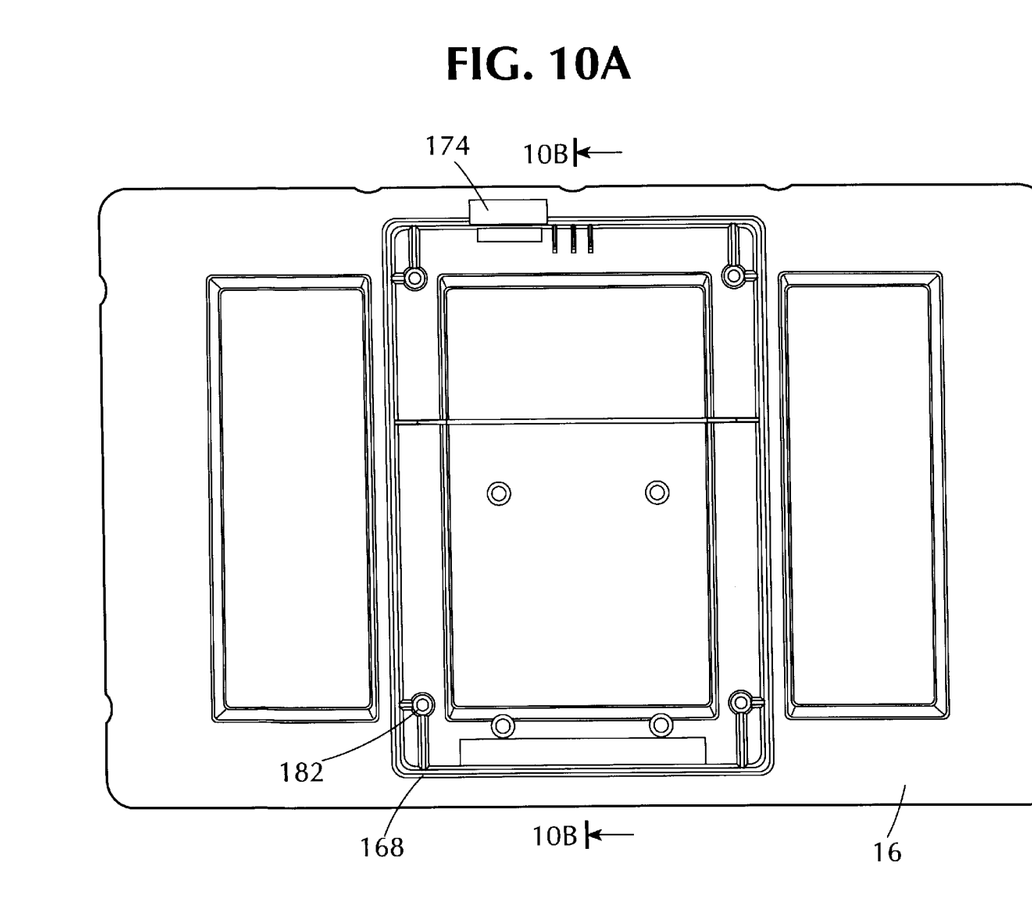
FIG. 10A is a rear view of the panel shown in FIG. 10.
Figure 10B:
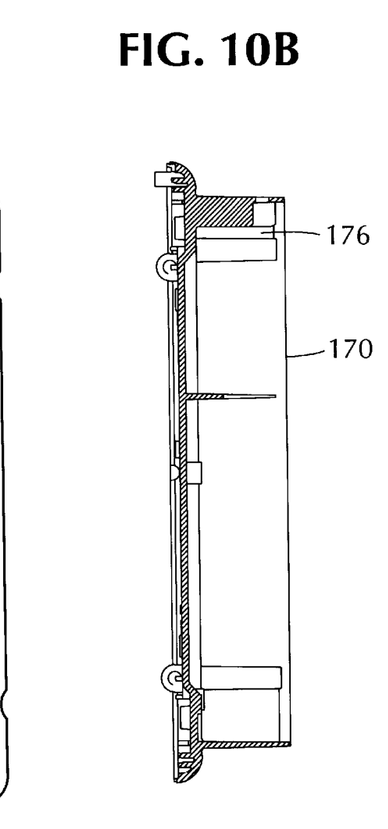
FIG. 10B is a sectional view taken along lines 10B—10B of FIG. 10A.

The rear face of the panel 16 in the FIG. 10 embodiment includes a rearwardly projecting housing 168 which is generally rectangular in plan as seen in FIG. 10A and has an open rear end 170 as seen in FIG. 10B. Panel 16 has a wire-way 174 formed wherein which passes through an opening which constitutes an opening in the inner face of the panel leading through a passage 174 to the interior of the projection 170. The projection 170 contains space for the mounting of electrical controls and battery supplies as discussed above with the prior embodiments.

Figure 11:
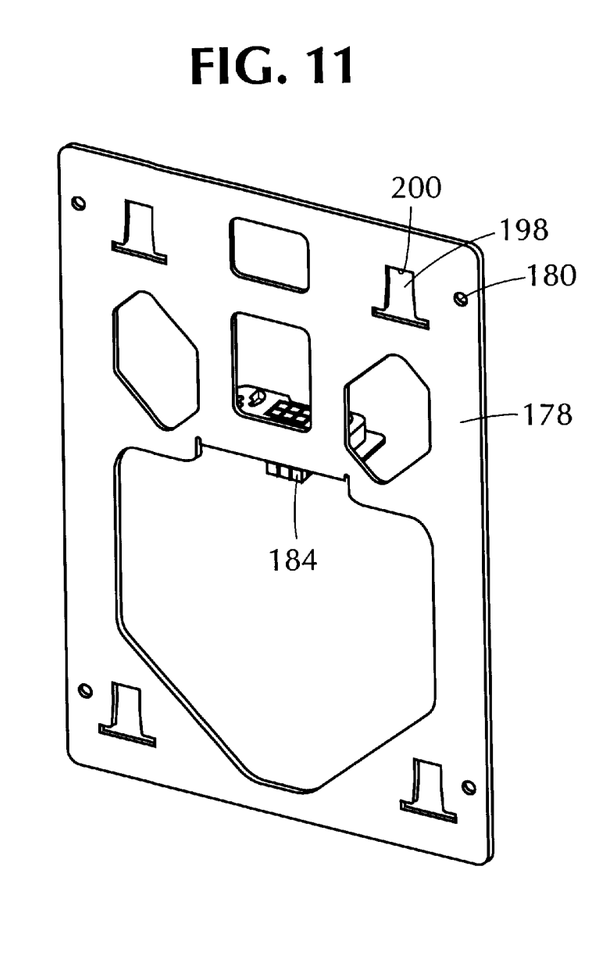
FIG. 11 is a perspective view of a rear mounting plate used with the embodiment of FIG. 10B.

In this embodiment the rear opening of projection 170 is closed by a first face plate 178, as seen in FIG. 11. This face plate is generally rectangular in plan and complementary to the rectangular plan of the projection 168. The plate is firmly secured to projection 168 through screws (not shown) passing through openings 180 in plate 178 and threaded into the screw bosses 182 in the projection 168. Plate 178 has a conventional Molex connector 184 securely mounted therein in any convenient manner. The wires from the controls and/or batteries within the projection 168 are connected to the Molex connector. In the illustrative embodiment of FIG. 11 the Molex connector half on plate 178 is the male half.

Figure 12:
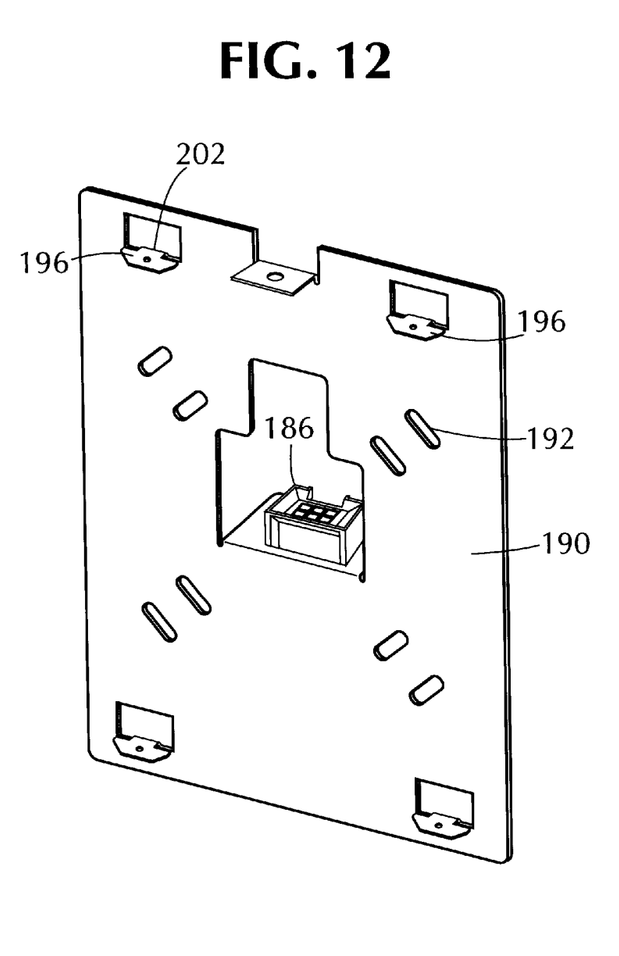
FIG. 12 is a junction box cover plate used with the embodiment of the invention shown in FIG. 10B.
Figure 13:
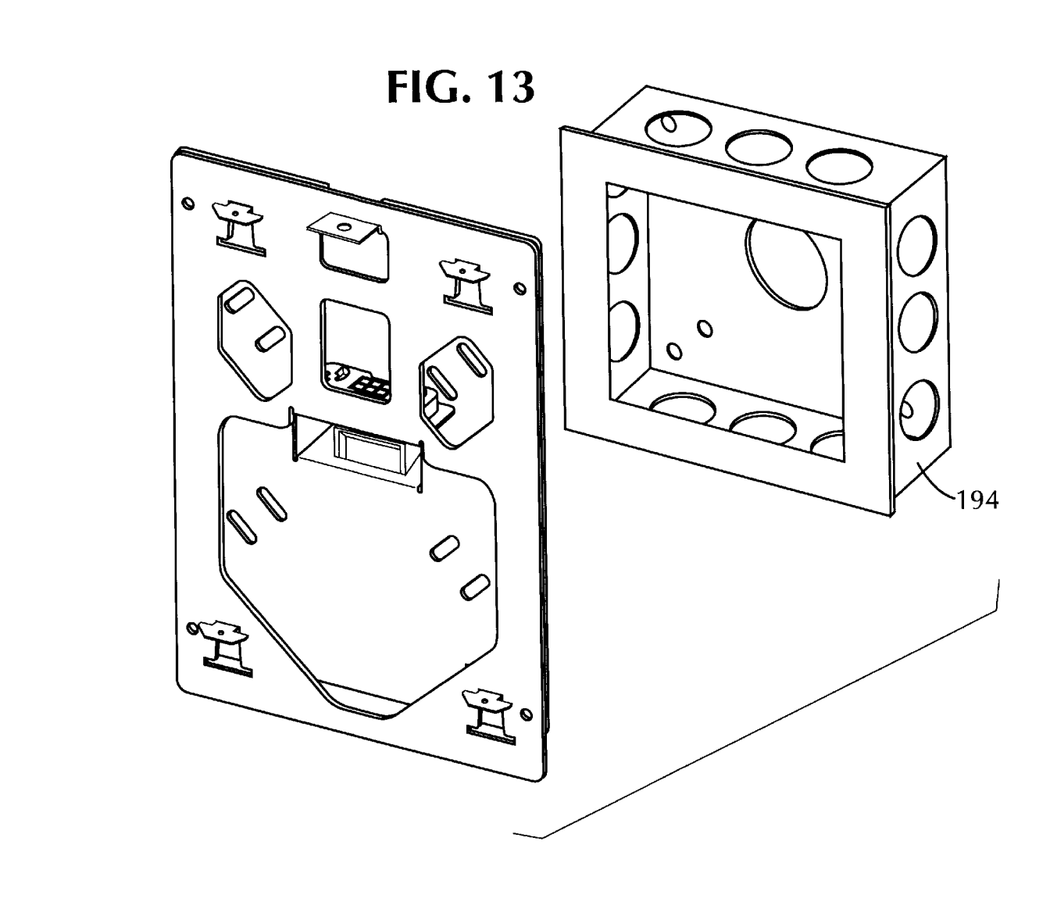
FIG. 13 is an exploded perspective view of a junction box and the two mounting plates of FIGS. 11 and 12.

The lighting and the illuminate sign of the embodiment of FIGS. 10–11 is mounted on a junction box through a junction box face plate 190, seen in FIG. 12. This face plate has a plurality of apertures 192 formed therein which allow the plate to be bolted to a conventional junction box 194, as shown in FIG. 13. The plate has a female Molex connector 168 mounted thereon which is connected to the electrical power supply in the junction box in the conventional manner.

Plate 190 includes a plurality of projecting tabs 196 which extend therefrom in the direction away from the junction box facing plate 198 on the back of the frame 16. The plate 198 has T-slot openings 198 formed therein which mate with the T-shaped tabs 196. Thus, the sign is easily mounted to the junction box by inserting tabs 196 in T-slots 198 and allowing slots 198 to move downwardly so that their upper ends 200 are supported on the stems 202 of tabs 196. This sliding motion causes the male Molex connector 168 to enter the female molex connector 186 to form a firm electrical connection.

Figure 14:
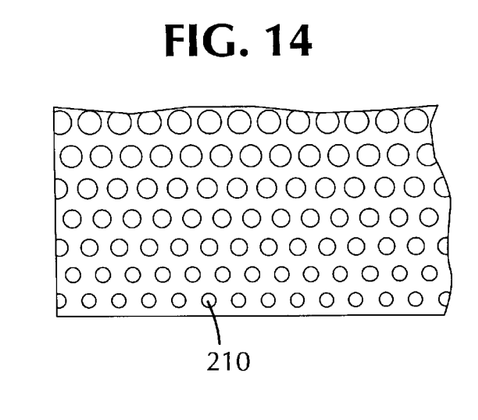
FIG. 14 is an enlarged partial view of a display panel used with the present invention.

In order to assist the passage of light from the panels 34, 36 in the sign when used with a CCFL lamp, the acrylic panels 34, 36 are etched with a series of fine dots 210 (shown in enlarged scale in FIG. 14) whose diameters increase slightly as the dots progress from a point near the position of the lamp to a point further away. These etched dots on the panel assist in reflecting light from the interior of the panel outwardly.

When an LED light system is used with the present invention a single acrylic panel, etched with the sign indicia, can be used as is known in the art so that the light projected into the panel from the LED is emitted out of the etched areas. Alternatively, the panel can be a plain acrylic panel silkscreened red or green as the color of the indicia, again as is known in the art.

The present invention provides a very thin light weight illuminated sign particularly adapted for use as an exit sign which will be very efficient in use and operation. This thin housing arrangement is made possible by the use of the CCFL and/or LED lamps and allows all of the control equipment to be mounted within the housing or in the canopy or projection associated therewith. The product is relatively inexpensive to manufacture since the frames are essentially identical and fit together easily. As a result a reduced parts inventory is required for the suppliers and/or manufacturer. Indeed, even the same support channel is used to support either types of light sources used with the sign, i.e., LED strips or CCFL lamp. In addition the lamp sign of the present invention is easily disassembled so that the user or operator can readily change and, where the CCFL is used, the colors used on the sign can be varied and also easily changed.

Although the various embodiments of the present invention have been described here in detail in connection with the accompanying drawings, it is to be understood that the invention is not limited to those precise embodiments, but that various changes and modifications may be effected therein by those skilled in the art without departing from the scope or spirit of this invention.

What is claimed is:

1. An illuminated sign comprising first and second frame members;
   at least said first frame member having a central opening formed therein;
   said first and second frame members each having complementary peripheral edge portions, said first frame member having an inner face surrounding said opening and said second frame member having an inner face portion; and
   illuminating means;
   said inner face of the first frame member and the inner face portion of the second frame member being complementary and including mirror image mounting means for mounting the illuminating means between the frame members; and
   said illuminating means including a support channel;
   said mirror image mounting means and channel including cooperating means for mounting the channel between the frame members;
   wherein said cooperating means comprise i) projections extending from the inner face and inner face portion of said first and second frame members and ii) recesses in the exterior of said channel dimensioned to frictionally receive said projections;
   said channel being mounted between said frames to open towards the opening in said first frame.

2. An illuminated sign as defined in claim, 1 including a cold cathode fluorescent lamp and means for resiliently mounting said lamp within said channel.

3. An illuminated sign as defined in claim 2 wherein said channel includes means for mounting a strip of LED lamps therein.

4. An illuminated sign as defined in claim 2 wherein said means for resiliently mounting said lamp in said channel comprises a pair of blocks of resilient material shaped to resiliently and releasably clamp said lamp therein.

5. An illuminated sign as defined in claim 1 including a translucent panel and a sign film sheet having signage indicia thereon positioned between said frame members whereby light from the illuminating means enters the panel through an edge thereof, and clamp means for clamping said panel and film on one of said frame members.

6. An illuminated sign as defined in claim 5 wherein said clamp means comprises a plurality of rotatable asymmetric flanged clamps pivotally mounted on one of said frames.

7. An illuminated sign as defined in claim 1 wherein said second frame member includes a central opening complementary to the central opening in the first frame member.

8. An illuminated sign as defined in claim 7 including a pair of translucent panels and sign films therebetween having signage indicia thereon, said panels and film being positioned between said frame members whereby light from the illuminating means enters the panels through an edge thereof, and clamp means for clamping the panels and films on one of the frame members.

9. An illuminated sign as defined in claim 7 including mounting canopy means for selectively mounting said sign to a ceiling or side wall.

10. An illuminated sign as defined in claim 9 wherein said frame members define a peripheral edge for the sign and said canopy has a recess formed therein which is complementary to and receives said peripheral edge of the sign.

11. An illuminated sign as defined in claim 1 wherein the inner face and inner face portion of said first and second frame members include mirror image mounting means for mounting electronic controls for the lamp therein.

12. An illuminated sign comprising first and second frame members, at least said first frame member having a central opening formed therein;
   said first frame member having an inner face surrounding said opening and said second frame member having an inner peripheral face portion complementary to the inner face of the first frame member; and
   illuminating means;
   said inner face of the first frame member and the peripheral inner face portion of the second frame member being complementary and including means for engaging the illuminating means and mounting the illuminating means therebetween and means for mounting electronic controls for the illuminating means;
   said mounting means for engaging the illuminating means being mirror images of each other;
   said means for mounting electronic controls including an L-shaped bracket for supporting one end of a circuit board and at least one resilient snap member for holding the board in the frame members.

13. An illuminated sign as defined in claim 12 wherein said frame members have peripheral mating mirror image edge portions including cooperating resilient snap means for holding the frame members together.

14. An illuminated sign as defined in claim 13 wherein said frame members include cooperating bosses on their peripheral edges for permitting said frame members to be screwed together.

15. An illuminated sign as defined in claim 12 wherein said illuminating means includes a cold cathode fluorescent tube.

16. An illuminated sign as defined in claim 12 including translucent sign means mounted between said frame members in said opening and having a translucent edge portion and wherein said illuminating means is mounted in said frame members along the translucent edge portion of the sign means for illuminating the sign.

17. An illuminated sign as defined in claim 16 wherein said illuminating means includes a generally U-shaped support channel and a light source mounted therein, said channel having a pair of legs defining an opening therebetween and a bight portion, said mirror image mounting means and said legs of the channel including cooperating means for mounting the channel between the frame members with the opening facing the translucent edge portion of the sign means.

18. An illuminated sign comprising first and second frame members;

at least said first frame member having a central opening formed therein;

said first frame member having an inner face surrounding said opening and said second frame member having an inner peripheral face portion complementary to the inner face of the first frame member;

said inner face of the first frame member and the peripheral inner face of the second frame member being complementary and including means for mounting the illuminated means therebetween and means for mounting electronic controls for the illuminating means;

said mounting means being mirror images of each other;

translucent sign means mounted between said frame members in said opening and having a translucent edge portion and wherein said illuminating means is mounted in said frame members along the translucent edge portion of the sign means for illuminating the sign;

said illuminating means including a generally U-shaped support channel and a light source mounted therein, said channel having a pair of legs defining an opening therebetween and a bight portion, said mirror image mounting means and said legs of the channel including cooperating means for mounting the channel between the frame members with the opening of the channel facing the translucent edge portion of the sign means; and wherein said cooperating means comprise i) projections extending from the inner frame member face of the first frame member and the inner face portion of the second frame member and ii) recesses in the exterior of said channel dimensioned to frictionally receive said projections;

said channel being mounted between said frame members to open towards the opening in said first frame.

19. An illuminated sign as defined in claim 18 including a cold cathode fluorescent lamp and means for resiliently mounting said lamp within said channel.

20. An illuminated sign as defined in claim 18 wherein said channel includes means for mounting a strip of LED lamps therein.

21. An illuminated sign as defined in claim 18 wherein said second frame member includes a central opening complementary to the central opening in the first frame member.

22. An illuminated sign as defined in claim 21 including mounting canopy means for selectively mounting said sign to a ceiling or side wall.

23. An illuminated sign as defined in claim 22 wherein said frame members define a peripheral edge for the sign and said canopy has a recess formed therein which is complementary to and receives said peripheral edge of the sign.

* * * * *